US006705587B1

(12) United States Patent
Frank et al.

(10) Patent No.: US 6,705,587 B1
(45) Date of Patent: Mar. 16, 2004

(54) METHOD FOR POSITIONING THE ACTUATING DRIVE IN A FUEL INJECTOR DEVICE FOR IMPLEMENTING SAID METHOD

(75) Inventors: Wilhelm Frank, Bamberg (DE); Stefan Lehmann, Regensburg (DE); Martin Neumaier, Reithofen (DE); Gerd Schmutzler, Kareth (DE); Wendelin Kluegl, Seubersdorf (DE); Guenter Lewentz, Regensberg (DE); Reda Rizk, Cologne (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/743,183

(22) PCT Filed: May 4, 2000

(86) PCT No.: PCT/DE00/01408

§ 371 (c)(1),
(2), (4) Date: May 14, 2001

(87) PCT Pub. No.: WO00/68563

PCT Pub. Date: Nov. 16, 2000

(30) Foreign Application Priority Data

May 7, 1999 (DE) ........................................ 199 21 242

(51) Int. Cl.[7] ................................................ F16K 31/02

(52) U.S. Cl. .............................. 251/129.06; 239/102.1; 239/533.2; 137/315.03

(58) Field of Search .................. 251/129.06; 239/102.1, 239/102.2; 310/312; 137/315.03, 315.18

(56) References Cited

U.S. PATENT DOCUMENTS

| | | | |
|---|---|---|---|
| 5,740,969 | A | 4/1998 | Hoffmann et al. |
| 5,779,149 | A | 7/1998 | Hayes, Jr. |

FOREIGN PATENT DOCUMENTS

| | | | |
|---|---|---|---|
| DE | 3533 521 | A1 | 4/1987 |
| DE | 43 06 072 | A1 | 9/1994 |
| DE | 195 19 192 | C1 | 5/1995 |
| DE | 44 34 892 | A1 | 4/1996 |
| DE | 195 38 791 | A1 | 4/1997 |
| DE | 197 42 943 | C1 | 9/1997 |
| DE | 197 02 066 | A1 | 7/1998 |
| EP | 0 199 632 | A1 | 10/1986 |
| EP | 0 816 670 | A1 | 1/1998 |
| EP | 0 916 843 | | 5/1999 |
| WO | WO 99/17014 | | 4/1999 |

*Primary Examiner*—Gene Mancene
*Assistant Examiner*—M Cartagena

(57) ABSTRACT

The positioning of the actuating drive in a fuel injector with a piezoactor (2) that is screwed into the housing (1) of the fuel injector is performed by applying a voltage (U) to the piezoactor (2) that corresponds to a given idle stroke (h), and the surface grinding of the housing (3) and base plate (4) of the piezoactor (2) when voltage is applied. Between the housing (1) of the fuel injector and the housing (3) of the piezoactor (2), there is also provided a compensation collar (9) of a suitable thickness.

2 Claims, 1 Drawing Sheet

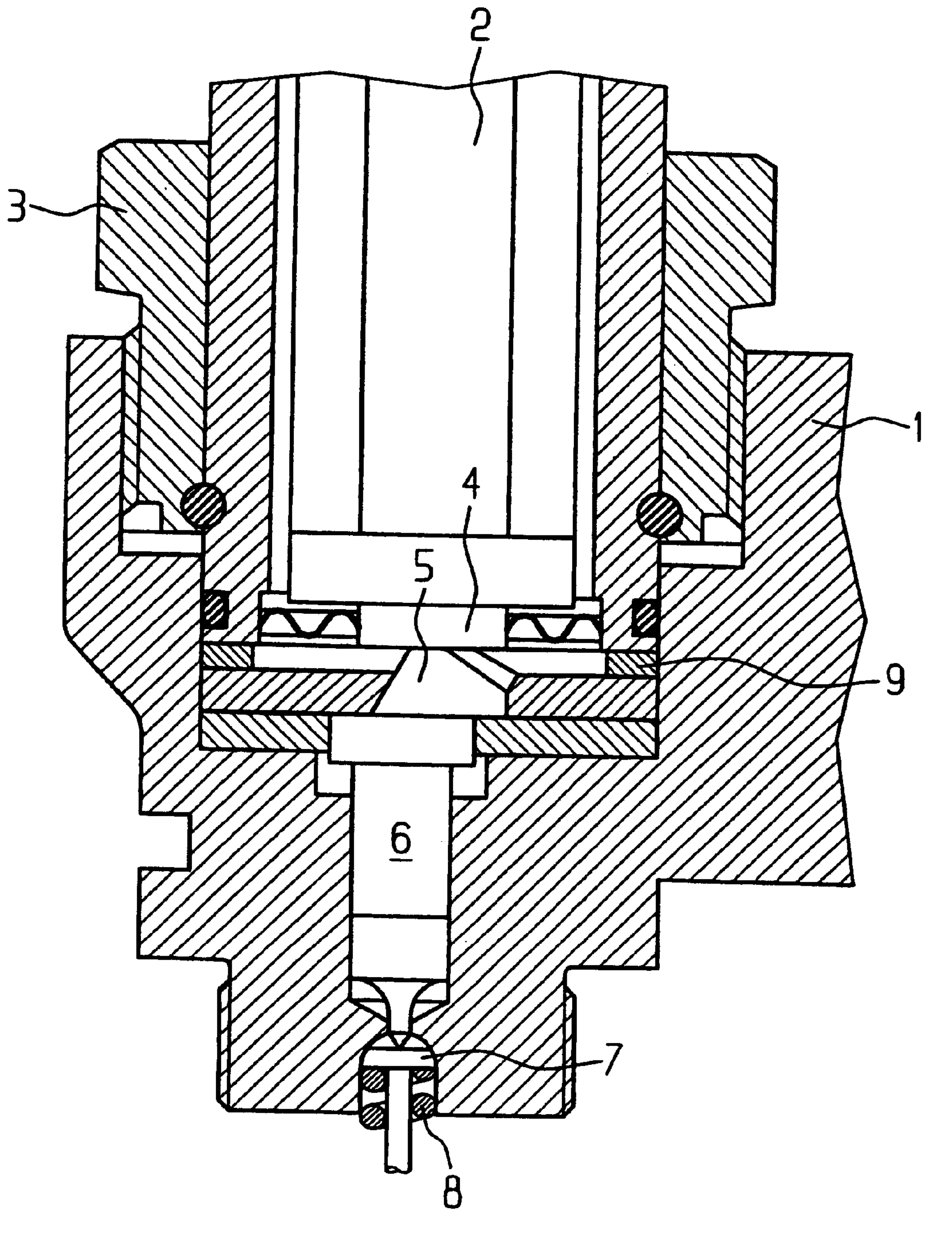
2
3
1
4
5
9
6
7
8

METHOD FOR POSITIONING THE ACTUATING DRIVE IN A FUEL INJECTOR DEVICE FOR IMPLEMENTING SAID METHOD

FIELD OF THE INVENTION

The invention involves a procedure for positioning the actuating drive in a fuel injector and a device for performing the procedure in accordance with the generic part of claim 1.

DESCRIPTION OF THE RELATED ART

Reservoir injection systems using very high injection pressures and high switching speeds are being increasingly used in the fuel supply of combustion engines. Such injection systems are known as common rail systems (for diesel engines) and HPDI injection systems (for Otto engines). In these reservoir injection systems, the fuel is fed into a high-pressure reservoir common to all cylinders. The fuel is then injected into the individual combustion chambers of the combustion engine by means of fuel injectors.

The fuel injector generally includes an injection valve that is opened and closed hydraulically by a servo valve in order to precisely set the timing of the injection process in the combustion chamber.

The servo valve is actuated by an electrically triggered actor. The use of piezoelectric actors has proven to be particularly effective in achieving sufficiently short switching times. In this kind of piezoelectric actor, longitudinal extension that is transferred to the servo valve which then again opens or closes the injection valve is brought about by the application of electrical voltage. For the longitudinal extension of the piezoelectric actor, which is in the μm range, to be able to actuate the servo valve, this longitudinal extension is generally either mechanically assisted by lever gears with bearings in fuel or hydraulically amplified by a pressure chamber.

A fuel injector with a piezoactor and hydraulic amplification is described, for example, in U.S. Pat. No. 5,779,149.

In order to be able to attain the high switching speeds required for optimal combustion timing and small injection amounts with the fuel injector, it is necessary to adjust the fuel injector very precisely.

This applies particularly to the idle stroke between the piezoelectric actor and the servo valve. On the one hand, the idle stroke should be as small as possible to have constantly defined conditions and to keep the dynamic loads low. On the other hand, there must be minimal play between the actor and the adjusting element in order to avoid malfunctions during operation.

The setting of the idle stroke in the fuel injector has previously be done in such a way that the exact configuration of the individual components of the fuel injector and especially spaces between them are determined by computer from the dimensions of these components.

For that purpose, each component has to be measured at considerable expense. After measurement, the idle stroke is then set by adjustment disks placed between the injector housing and the actor or the servo valve; these disks must have only very close tolerances and are therefore very expensive to manufacture.

To check the adjusted idle stroke, it has previously been necessary to assemble the fuel injector completely and to test it under operating conditions. If malfunctions are found, the fuel injector must be completely broken down again into its individual parts after the test run and possibly reworked or the adjustment disks must be replaced.

SUMMARY OF THE INVENTION

It is the task of this invention to create a procedure for positioning the actuating drive in a fuel injector and a device for performing such a procedure in which it is possible to reliably position the actuating drive in the fuel injector at little expense and to allow operational production-line testing of the fuel injector.

The invention fulfills this task with the measures indicated in claim 1.

The above task is accordingly fulfilled in this invention by adjusting the idle stroke in such a way that a defined electrical voltage is applied to the piezoactor before it is mounted in the fuel injector so as to cause a longitudinal extension of the piezoelements that corresponds exactly to the desired idle stroke. In this state, i.e., with voltage applied, the baseplate of the piezoactor is surface ground with the actor housing. In the no-current or no-voltage state, the baseplate stands back from the actor housing by the idle stroke distance. The invention also provides a compensation collar between the piezoactor and the housing of the fuel injector. The compensation collar is inserted into the fuel injector that is now completely assembled up to the piezoactor, and is deformed by a prestressing device with a flat effective area until the servo valve lifts up from its valve seat. If, instead of the prestressing device, the piezoactor is then screwed into the injector housing to the stop on the compensation collar, the idle stroke set as indicated above is necessarily adjusted between the baseplate of the piezoactor and the adjustment element of the fuel injector servo valve. In this way an effective connection is formed between the piezoactor and the adjustment element for the servo valve with determined positions in such a way that the idle stroke between the piezoactor and the adjustment element always keeps the given value despite the unavoidable manufacturing tolerances of the individual components.

For the surface grinding of the housing and baseplate of the piezoactor, the latter is preferably clamped into a grinder, with the given voltage being applied via slip rings on the piezoactor. The compensation collar consists preferably of soft iron or soft copper. During prestressing, the material of the compensation collar flows, which permanently changes the thickness of the compensation collar.

Alternatively, the piezoactor can be surface ground before it is mounted, without voltage being applied. The idle stroke provided is adjusted via a boss on the prestressing device during deformation of the compensation collar. In this alternate embodiment, the prestressing device does not consist of a flat stamp but a stamp with an embossed face.

BRIEF DESCRIPTION OF THE DRAWING

Embodiments of the invention are illustrated below in more detail in the diagram. The diagram shows a cross-section view of a fuel injector in the area of the connection between a piezoactor and an actuating drive for a servo valve.

DETAILED DESCRIPTION

The diagram shows in cross-section a part of an injector for fuel injection into the combustion chamber of a combustion engine in the case of a common rail system. Piezoactor 2 with housing 3 and baseplate 4 is screwed into housing 1 of the fuel injector. In housing 3 of piezoactor 2 there is a piezoelement arrangement (not shown in detail) with which baseplate 4 makes a connection. If an electrical voltage is applied to the piezoelement arrangement via leads (also not shown), its length changes and baseplate 4 thereby changes its position relative to actor housing 3.

If electrically triggered, piezoactor 2 acts on transfer element 5 in fuel injector housing 1. This means that when a voltage is applied to said piezoelement arrangement, baseplate 4 of piezoactor 2 moves outward from the actuator housing, i.e. downward in the diagram, due to the longitudinal extension of the piezoelements caused by the voltage applied, and transfer element 5 is therefore also moved accordingly.

Transfer element 5 in fuel injector housing 1 acts, for its part, on valve lifter 6 which fits against valve element 7 of a servo valve. Valve element 7 is compressed by spring 8 into its valve seat as long as piezoactor 2 is not triggered.

Instead of the transfer element 5 shown, hydraulic amplification of the stroke of piezoactor 2 may also be provided. In general, baseplate 4 of piezoactor 2 acts on an adjustment element for the servo valve of the fuel injector. Piezoactor 2 and the adjustment element form the actuating drive for the servo valve.

When valve element 7 lifts up from its seat, i.e., when the servo valve opens, fuel can drain in the familiar manner (see for example U.S. Pat. No. 5,779,149 cited in the introduction) from the control chamber of the injection valve contained in the fuel injector past valve element 7, which lowers the pressure in the control chamber and opens the injection valve.

When the triggering of piezoactor 2 ends and transfer element 5 and valve lifter 6 return to the starting position, valve element 7 of the servo valve is again compressed by spring 8 into its seat, so that the pressure in the control chamber of the injection valve is consequently again raised and the injection valve closes.

Between housing 3 of piezoactor 2 and housing 1 of the fuel injector there is compensation collar 9.

When piezoactor 2 is triggered, baseplate 4 of the piezoactor moves relative to its housing 3 which, in the mounted state, is screwed firmly into housing 1 of the fuel injector. Transfer element 5, which may be a mechanical lever gear or a hydraulic amplifier, transfers this amplified movement to valve lifter 6 which actuates valve element 7 of the servo valve.

To set a defined idle stroke h in the actuating drive made up of piezoactor 2, transfer element 5 and valve lifter 6, piezoactor 2 is shaped in such a way before it is mounted into injector housing 1 that baseplate 4 stands back from housing 3 of the piezoactor by exactly the given idle stroke distance h. For this purpose, exactly the voltage U which causes a longitudinal extension of the piezoelement arrangement corresponding to the given idle stroke h is applied to piezoactor 2 before it is incorporated into injector housing 1, and housing 3 and baseplate 4 of piezoactor 2 are surface ground when voltage U is applied.

For this purpose, piezoactor 2 can be clamped into a grinder, for example, with voltage U being supplied via slip rings.

After the surface grinding process and removal of voltage U, baseplate 4 then stands back from housing 3 of piezoactor 2 by the given idle stroke h.

The manufacturing and other tolerances in the fuel injector are compensated for by compensation collar 9.

Compensation collar 9, which consists of a soft, deformable material such as soft iron or soft copper, is inserted into the fuel injector that is completely assembled up to piezoactor 2. Instead of piezoactor 2, a prestressing device the face of which corresponds to baseplate 4 and is completely flat is then screwed into the fuel injector. The prestressing device is screwed in until the flat face of the prestressing device begins to lift valve element 7 of the servo valve up from its valve seat due to the actuation of transfer element 5. Compensation collar 9, which is made of a soft material, on which the flat face of the prestressing device also acts, is permanently deformed by flowing of the material. When the prestressing device is removed, compensation collar 9 then retains the thickness which it had when the prestressing device was screwed in far enough for the servo valve to begin to open.

Finally, if, instead of the prestressing device, piezoactor 2, baseplate 4 of which stands back by given idle stroke h as described above, is screwed into housing 1 of the fuel injector as far as the stop, i.e., up to contact of piezoactor housing 3 with compensation collar 9, the leading edge of piezoactor housing 3 is located where the face of the prestressing device was when the servo valve began to open. Since, however, baseplate 4 of piezoactor 2 stands back by given idle stroke h in the no-voltage state, the idle stroke of the actuating drive in the fuel injector, i.e., the play between baseplate 4 of piezoactor 2 and the servo valve, corresponds exactly to given value h.

In an alternative method of proceeding, piezoactor 2 is shaped in such a way before being mounted into injector housing 1 that baseplate 4 and housing 3 of piezoactor 2 are surface ground in the mounting-ready state but without voltage being applied. After the grinding process, baseplate 4 of piezoactor 2 is therefore at exactly the same location as housing 3 of piezoactor 2. For this the prestressing device for deforming compensation collar 9 does not have a flat face but a face bearing a boss of height h at the point or points at which the prestressing device acts on transfer element 5.

The central effective area on the prestressing device that engages transfer element 5 protrudes, in other words, in the mounting direction by given value h for the idle stroke compared with the effective area running around at the edge which engages with compensation collar 9.

Instead of piezoactor 2, the prestressing device is screwed, as for the first embodiment, into the fuel injector until valve element 7 of the servo valve begins to open due to the actuation of transfer element 5 by the raised section on the face of the prestressing device. Compensation collar 9 is thereby permanently deformed as above. Then, instead of the prestressing device, piezoactor 2, at which housing 3 and base plate 4 have been surface ground without applied voltage, is screwed into housing 1 of the fuel injector as far as the stop on compensation collar 9.

In this embodiment the idle stroke also has exactly given value h between piezoactor 2 and the servo valve, since the thickness of compensation collar 9 is adjusted with the prestressing device in such a way that the servo valve begins to open only when the fuel injector is operated, after baseplate 4 of piezoactor 2 has covered no-load path h when triggered.

What is claimed is:

1. A procedure for producing an actuating drive for a fuel injector with a piezoactor (2), the piezoactor (2) being movably mounted in a housing (3) and having a baseplate (4) adjoining an opening in the housing (3), characterized in that a presettable excursion of the piezoactor (2) is adjusted by applying an electrical voltage to the piezoactor.(2), and that the housing (3) in the area of the opening and the base plate (4) are surface ground when the electrical voltage is applied.

2. The procedure according to claim 1, characterized in that, for surface grinding the housing (3) and the base plate (4) of the piezoactor (2), the piezoactor (2) is clamped into a grinder, electrical voltage (U) being applied to the piezoactor (2).

* * * * *